June 16, 1931.   E. C. SWANSON   1,809,993
CIRCLE HOLE CUTTER
Filed March 1, 1929
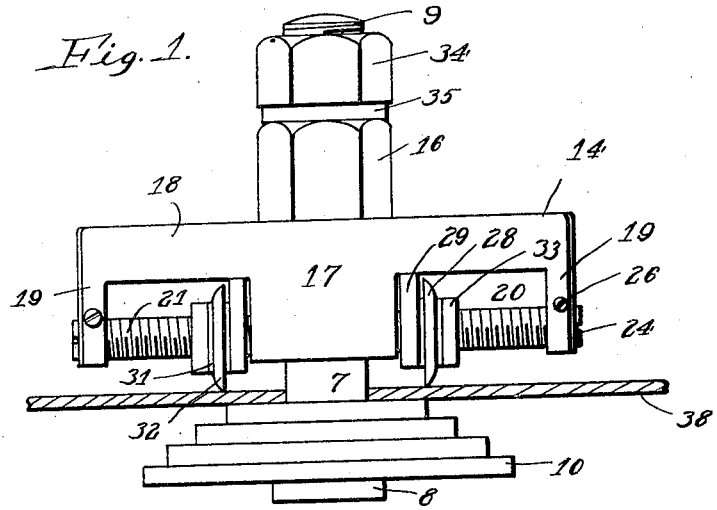
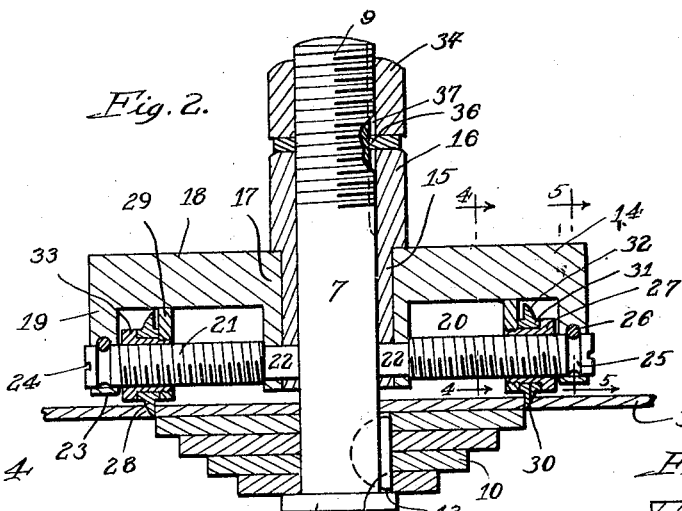
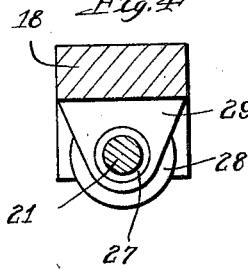
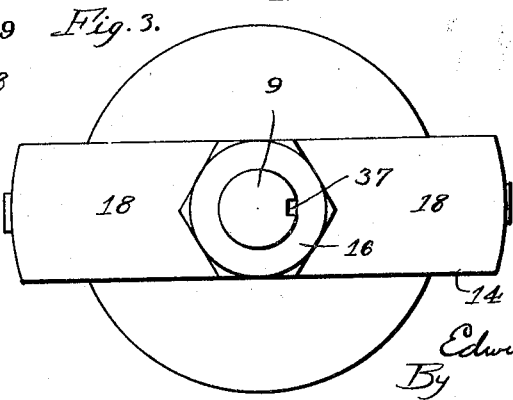
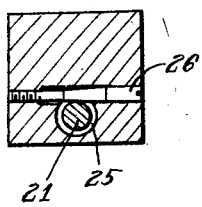
Inventor:
Edwin C. Swanson
By
Wilson & McCanna
Attys.

Patented June 16, 1931

1,809,993

UNITED STATES PATENT OFFICE

EDWIN C. SWANSON, OF ROCKFORD, ILLINOIS, ASSIGNOR TO GREENLEE BROS. & CO., OF ROCKFORD, ILLINOIS, A CORPORATION OF ILLINOIS

CIRCLE HOLE CUTTER

Application filed March 1, 1929. Serial No. 343,593.

My invention relates to means for cutting circular holes in sheet metal or the like and is particularly adapted for use in making or enlarging holes in fuse boxes, junction boxes, switch boxes and the like.

The structure herein disclosed and claimed is an improvement on or modification of that claimed in my pending application Serial No. 343,592, filed March 1, 1929.

One of the objects of the present invention is to provide an improved means for making circular holes in sheet metal and sheet metal objects such for example as fuse boxes, junction boxes and the like.

I have aimed to provide a simple, self-contained and easily operable mechanism including a series of circular metal discs of varying diameters, cutter wheels adjustable to cooperate with any one of the discs, supporting and turning means for the discs and the cutter wheels, and means for placing pressure between the two to effect the cutting of an interposed sheet of metal.

Other objects and advantages will become apparent to those skilled in the art from an examination of the following description and the accompanying drawings in which—

Figure 1 is a side elevation of the cutter showing the smallest disc uppermost and the cutter wheels set to cooperate therewith;

Fig. 2 is a vertical section through the center of the cutter showing the largest disc uppermost and the cutter wheels set to cooperate therewith;

Fig. 3 is a top view of the cutter;

Fig. 4 is a section on the line 4—4 of Fig. 2 showing the cutter wheel and mounting; and Fig. 5 is a section on the line 5—5 of Fig. 2.

The invention consists generally in a bolt or other supporting member upon which is mounted a series of circular discs adapted to be interchanged in position, a rotatable cutter arm upon which is supported a plurality of cutter wheels adjustable to cooperate with any of the circular discs, and means for urging the cutter wheels and discs toward each other to sheer sheet material placed therebetween.

The mechanism centers around supporting member as a bolt 7 having a flat head portion 8. Resting over the bolt and supported on the head 8 are a number of discs 10 of different diameters. They each have a central circular opening in which the bolt fits and a concentric outer edge 11 at right angles to the face of the disc. The discs are held in non-rotatable relation to the bolt 7 by a key 12 fitting in keyways 13 of the discs. The discs are adapted to be interchanged, any particular disc being placed uppermost as desired or all of them may be removed from the bolt and only the disc to be used in cutting may be placed thereon. The discs not actually employed in doing the cutting will, however, ordinarily be used to support and lend strength to the cutting disc.

In use the bolt 7 will be passed through an opening in the sheet metal 38 and the discs brought up against the lower side thereof. The remainder of the cutter will then be assembled upon the opposite side of the metal. A cutter bar designated generally by 14 having an inset sleeve portion 15 at its center is rotatably supported on the bolt 7. The sleeve 15 having a projecting nut-like portion 16 which permits the use of a wrench thereon in turning the cutter bar, acts as a bearing on the bolt 7 for the cutter bar. The cutter bar consists of a central hub portion 17, laterally projecting arms 18, and downwardly projecting end portions 19, this construction leaving a recessed space 20 between the end portions 19 and the central portion 17. Passing through the spaces 20 and supported in the end portions 19, the center portion 17 and the sleeve 15 are advancing screws 21. The inner ends of the screws are provided with bearing portions 22 which pass through the central portion 17 of the bar and into the sleeve 15, thus serving to prevent the sleeve from moving in the central portion 17. The outer ends of the advancing screws are provided with bearing portions 23 having a screw slot 24 and an inset seat portion 25 adapted to cooperate with a set screw 26 in preventing endwise movement of the advancing screw. Bushings 27 are threaded upon the advancing screw in a manner to be moved along the screw when the latter is turned at 24 as by a screw driver. Cutter wheels 28 and bearing blocks 29 are mounted upon the bushings, the former rotatably supported on bearing surfaces 30 and the latter fixedly attached to the bushings. The cutter wheels each consist of a cylindrical hub portion 31 and a marginal cutting rim 32 extending outward therefrom, one side thereof lying at right angles to the cylindrical hub and the other side sloping therefrom to meet the vertical side in a cutting edge. The cutter wheels are prevented from free lateral movement by flanges 33 on the bushings and bearing blocks 29.

Pressure is placed upon the sheet metal between the cutter wheels and the circular discs by means of a nut 34 which is threaded on the end of the supporting bolt 7. A washer 35 having a projection 36 adapted to engage a keyway 37 in the bolt is interposed between the nut 34 and the cutter arm to prevent motion of the latter from being transmitted to the former and disturbing its adjustment.

It will thus be seen that any one of the discs 10, depending upon the size of hole desired, may be placed uppermost and the cutter wheels 28 adjusted, by means of the advancing screws 21, to cooperate with the edge of the disc. A small hole, large enough to accommodate the bolt 7 may then be placed in the metal to be cut by means of a drill or otherwise. The bolt 7 is inserted in the hole with the disc below the metal and the remainder of the cutter assembled thereon. The nut 34 is then turned down as with a wrench until a pressure exists on the metal between the cutter wheels and the disc. The cutter arm 18 may then be rotated by grasping the part 16 with a wrench or otherwise, this movement tending to progressively sheer the metal between the outer edge of the disc and the cutter wheels. Alternate tightening of the nut 34 and turning of the cutter arm will result in complete severance of the metal at the periphery of the uppermost disc.

The mechanism is sturdy, easily operated, and requires but a small amount of space for use. It is capable of use in cutting practically any size of hole within its range, depending upon the disc employed, and is easily and cheaply manufactured.

While I have shown and described a particular form of my invention I am aware that numerous alterations may be made thereon without departing from the spirit of the invention or the scope of the appended claims in which—

I claim:

1. A circle cutter of the character described comprising a supporting member, a plurality of interchangeable circular discs of different diameters mounted thereon, and a cutter bar coaxial with said discs and rotatable about said supporting member, said cutter bar being equipped with cutter wheels and screw adjusting means operable to support and position the cutter wheels in cutting relation with the periphery of any one of said circular discs.

2. A circle cutter of the character described comprising a supporting member, a plurality of interchangeable circular discs of different diameters mounted thereon, a cutter bar rotatably mounted on said supporting member coaxially with said discs, cutter wheels rotatably supported upon said cutter bar, means for supporting and progressively advancing or retracting said cutter wheels radially from the center of said cutter bar to cooperate with said discs, and manually operable means for urging the cutter wheels and circular discs toward each other whereby material placed therebetween will be progressively sheared when the cutter bar is turned.

3. A circle cutter of the character described having a supporting member, a plurality of coaxial circular cutting edges of different diameters mounted thereon any one of which is adapted to be placed in operative position against one side of a metal sheet to be cut, cutting wheels adapted to bear against the opposite side of the metal sheet opposite the periphery of the circular cutting edge located in operative position to cooperate therewith in cutting a circular hole in the metal, cutter wheel supporting means rotatable on said supporting member about the axis of the circular cutting edges, means on said supporting member operable independently of said supporting means to apply pressure between the cutter wheels and said cutting edges for cutting the metal, and screw adjusting means for moving the cutter wheels to set them in cooperative relation with any one of said circular cutting edges.

4. A circle cutter comprising a plurality of interchangeable circular discs, a supporting bolt passing through the center thereof and attached thereto adapted to pass through a hole in the stock to be cut, a cutter bar rotatably mounted upon said supporting bolt on the opposite side of the stock from said disc having recessed portions therein, screws in said recessed portions seated at their ends in said bar, cutter wheels mounted on said screws adapted to be moved thereby in said recessed portions to cooperate with said circular discs, and a nut threaded on said supporting bolt to be turned downward in bringing the cutter wheels and disc together to exert a pressure upon the stock therebetween.

5. A circle cutter as set forth in claim 4 having bushings mounted upon the screws adapted to rotatably hold the cutter wheels, and bearing blocks acting between said bushings and the cutter arm to strengthen and support the screws.

6. In a circle cutter of the character described a cutter bar assembly comprising a cutter arm having a central hub portion, laterally projecting arms and vertical end portions, screws each having an intermediate threaded portion and end bearings one in the central hub portion and the other in a vertical end portion, a bushing threadingly mounted upon each screw, a cutter wheel rotatably supported upon each bushing, and a bearing block acting between each bushing and the adjacent laterally projecting arm to support the former when stock is being cut, each screw being rotatable to adjust the position of its cutter wheel.

In witness of the foregoing I affix my signature.

EDWIN C. SWANSON.